(12) United States Patent
Suzuki et al.

(10) Patent No.: US 11,500,184 B2
(45) Date of Patent: Nov. 15, 2022

(54) IMAGING LENS AND IMAGING APPARATUS

(71) Applicant: FUJIFILM Corporation, Tokyo (JP)

(72) Inventors: Takashi Suzuki, Saitama (JP); Michio Cho, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 282 days.

(21) Appl. No.: 16/985,312

(22) Filed: Aug. 5, 2020

(65) Prior Publication Data

US 2021/0048652 A1 Feb. 18, 2021

(30) Foreign Application Priority Data

Aug. 12, 2019 (JP) .............................. JP2019-148267

(51) Int. Cl.
| | |
|---|---|
| *G02B 9/12* | (2006.01) |
| *G02B 13/18* | (2006.01) |
| *G02B 5/00* | (2006.01) |
| *G02B 9/18* | (2006.01) |
| *G02B 27/00* | (2006.01) |

(52) U.S. Cl.
CPC ............. *G02B 13/18* (2013.01); *G02B 9/12* (2013.01); *G02B 5/005* (2013.01); *G02B 9/18* (2013.01); *G02B 27/0025* (2013.01)

(58) Field of Classification Search
CPC .......... G02B 13/18; G02B 5/005; G02B 9/12; G02B 27/0025; G02B 9/18
USPC ................................. 359/716, 740, 784, 791
See application file for complete search history.

(56) References Cited

U.S. PATENT DOCUMENTS

| | | | |
|---|---|---|---|
| 8,149,524 B2* | 4/2012 | Inoue ..................... | G02B 13/04 359/784 |
| 8,390,943 B2* | 3/2013 | Uemura ................. | G02B 13/18 359/791 |
| 2011/0109977 A1* | 5/2011 | Hayakawa ..... | G02B 15/143503 359/683 |
| 2011/0176215 A1* | 7/2011 | Mouri .................... | G02B 1/113 359/716 |

(Continued)

FOREIGN PATENT DOCUMENTS

| | | |
|---|---|---|
| JP | 2011-175098 A | 9/2011 |
| JP | 2012-242504 A | 12/2012 |

(Continued)

OTHER PUBLICATIONS

An Office Action; "Notice of Reasons for Refusal," mailed by the Japanese Patent Office dated Jul. 12, 2022, which corresponds to Japanese Patent Application No. 2019-148267 and is related to U.S. Appl. No. 16/985,312; with English language translation.

*Primary Examiner* — Evelyn A Lester
(74) *Attorney, Agent, or Firm* — Studebaker & Brackett PC

(57) ABSTRACT

The imaging lens consists of, in order from the object side, a first positive lens group, a stop, a second positive lens group, and a third negative lens group. The first lens group includes a negative lens which has a concave surface on the image side, and two positive lenses which are disposed to be closer to the image side than the negative lens and which have respective convex surfaces on the object side, convex surfaces on the object side. The second lens group includes an aspheric lens, and two sets of cemented lenses disposed to be closer to the image side than the aspheric lens. The third lens group consists of one lens component.

20 Claims, 8 Drawing Sheets

EXAMPLE 1

(56) References Cited

U.S. PATENT DOCUMENTS

| | | | |
|---|---|---|---|
| 2012/0212842 A1* | 8/2012 | Hosoi | H04N 5/2254 |
| | | | 359/784 |
| 2014/0368926 A1 | 12/2014 | Suzuki | |
| 2015/0268449 A1* | 9/2015 | Kurioka | G02B 9/12 |
| | | | 359/740 |
| 2015/0312454 A1 | 10/2015 | Iiyama et al. | |
| 2016/0077308 A1* | 3/2016 | Su | G02B 9/64 |
| | | | 359/740 |
| 2019/0361228 A1 | 11/2019 | Sugawa | |

FOREIGN PATENT DOCUMENTS

| | | |
|---|---|---|
| JP | 2015-001641 A | 1/2015 |
| JP | 2019-207267 A | 12/2019 |
| WO | 2014/118865 A1 | 8/2014 |

* cited by examiner

EXAMPLE 2

EXAMPLE 3

EXAMPLE 1

IMAGING LENS AND IMAGING APPARATUS

CROSS-REFERENCE TO RELATED APPLICATIONS

The present application claims priority under 35 U.S.C. § 119 to Japanese Patent Application No. 2019-148267, filed on Aug. 12, 2019. The above application is hereby expressly incorporated by reference, in its entirety, into the present application.

BACKGROUND OF THE INVENTION

1. Field of the Invention

The present disclosure relates to an imaging lens and an imaging apparatus.

2. Description of the Related Art

In the related art, as an imaging lens applicable to an imaging apparatus such as a digital camera, for example, a lens described in JP2015-001641A below has been proposed. JP2015-001641A discloses an imaging lens having, in order from the object side, a first lens group having a positive refractive power, a stop, and a second lens group having a positive refractive power. The second lens group has, in order from the object side, an aspheric lens and a triplet cemented lens.

SUMMARY OF THE INVENTION

An object of the present disclosure is to provide an imaging lens of which the total length of a lens system is short and which has high optical performance by satisfactorily correcting various aberrations, and an imaging apparatus comprising the imaging lens.

The imaging lens according to an aspect of the present disclosure consists of, in order from an object side to an image side: a first lens group having a positive refractive power; a stop; a second lens group having a positive refractive power; and a third lens group having a negative refractive power, in which the first lens group includes a negative lens which has a concave surface on the image side, and two positive lenses which are disposed to be closer to the image side than the negative lens and which have respective convex surfaces on the object side, in which the second lens group includes an aspheric lens, and two sets of cemented lenses disposed to be closer to the image side than the aspheric lens, and in which the third lens group consists of one lens component.

In the imaging lens of the above aspect, assuming that a focal length of the imaging lens in a state where an object at infinity is in focus is f, and a focal length of the third lens group is f3, it is preferable that Conditional Expression (1) is satisfied, and it is more preferable that Conditional Expression (1-1) be satisfied.

$$-1.5 < f/f3 < -0.4 \tag{1}$$

$$-1.3 < f/f3 < -0.5 \tag{1-1}$$

In the imaging lens according to the above aspect, in each of the two sets of cemented lenses, at least one positive lens and at least one negative lens are cemented, and assuming that a maximum value of refractive indexes of the positive lenses included in the cemented lenses in the second lens group at a d line is N2cpmax, it is preferable that Conditional Expression (2) is satisfied, and it is more preferable that Conditional Expression (2-1) be satisfied.

$$1.8 < N2cpmax < 2.2 \tag{2}$$

$$1.8 < N2p < 2.1 \tag{2-1}$$

In the imaging lens according to the above aspect, in each of the two sets of cemented lenses, at least one positive lens and at least one negative lens are cemented, and assuming that a maximum value of Abbe numbers of the positive lenses included in the cemented lenses in the second lens group based on a d line is ν2cpmax, it is preferable that Conditional Expression (3) is satisfied, and it is more preferable that Conditional Expression (3-1) be satisfied.

$$50 < \nu 2cpmax < 110 \tag{3}$$

$$60 < \nu 2p < 105 \tag{3-1}$$

In the imaging lens of the above aspect, in each of the two sets of cemented lenses, at least one positive lens and at least one negative lens are cemented, and assuming that a partial dispersion ratio of a positive lens having a largest Abbe number based on the d line among the positive lenses included in the cemented lenses in the second lens group between a g line and an F line is θgFp, and a partial dispersion ratio of a negative lens cemented to the positive lens having the largest Abbe number based on the d line among the positive lenses included in the cemented lenses in the second lens group between the g line and the F line is θgFn, it is preferable that the imaging lens includes at least one negative lens satisfying Conditional Expression (4).

$$0 < \theta gFn - \theta gFp < 0.06 \tag{4}$$

In the imaging lens of the above aspect, it is preferable that the second lens group includes a first cemented lens in which a positive lens and a negative lens are cemented in order from the object side and which has a cemented surface convex toward the image side, and a second cemented lens which is disposed to be closer to the image side than the first cemented lens and a negative lens and a positive lens having a convex surface on the image side are cemented in order from the object side.

In the imaging lens of the above aspect, it is preferable that the entire second lens group moves along an optical axis during focusing.

In the imaging lens of the above aspect, assuming that a lateral magnification of the second lens group in a state where an object at infinity is in focus is β2, and a lateral magnification of the third lens group in a state where an object at infinity is in focus is β3, it is preferable that Conditional Expression (5) is satisfied, and it is more preferable that Conditional Expression (5-1) be satisfied.

$$1 < (1\beta 2^2) \times \beta 3^2 < 1.5 \tag{5}$$

$$1.05 < (1-\beta 2^2) \times \beta 3^2 < 1.4 \tag{5-1}$$

In the imaging lens according to the above aspect, it is preferable that in each of the two sets of cemented lenses, at least one positive lens and at least one negative lens are cemented, and a positive lens having a highest refractive index at a d line among the positive lenses included in the cemented lenses in the second lens group is included in the cemented lens closest to the image side in the second lens group.

In the imaging lens according to the above aspect, it is preferable that in each of the two sets of cemented lenses, at least one positive lens and at least one negative lens are cemented, and a positive lens having a largest Abbe number based on a d line among the positive lenses included in the cemented lenses in the second lens group is included in the cemented lens closest to the object side in the second lens group.

In the imaging lens of the above aspect, it is preferable that the first lens group consists of, in order from the object side to the image side, a first A lens group and a first B lens group, and the first B lens group consists of, in order from the object side to the image side, a cemented lens in which a positive lens convex toward the object side and a negative lens concave toward the image side are cemented, and a positive meniscus lens convex toward the object side.

In the imaging lens of the above aspect, it is preferable that a lens closest to the object side in the first lens group is a negative lens concave toward the image side.

In the imaging lens of the above aspect, it is preferable that the third lens group is a single lens.

In the imaging lens of the above aspect, it is preferable that the aspheric lens has a meniscus shape concave toward the object side in a paraxial region.

In the imaging lens according to the above aspect, it is preferable that the second lens group consists of five lenses.

An imaging apparatus according to another aspect of the present disclosure comprises the imaging lens according to the above aspect of the present disclosure.

In the present specification, it should be noted that the terms "consisting of ~" and "consists of ~" mean that the lens may include not only the above-mentioned elements but also lenses substantially having no refractive powers, optical elements, which are not lenses, such as a stop, a filter, and a cover glass, and mechanism parts such as a lens flange, a lens barrel, an imaging element, and a camera shaking correction mechanism.

It should be noted that, in the present specification, the term "~ group having a positive refractive power" means that the group has a positive refractive power as a whole. Similarly, the term "~ group having a negative refractive power" means that the group has a negative refractive power as a whole. The term "a lens having a positive refractive power" and the term "a positive lens" are synonymous. The term "a lens having a negative refractive power" and the term "negative lens" are synonymous. The "~ lens group" is not limited to a configuration using a plurality of lenses, but may consist of only one lens. The "single lens" means one uncemented lens.

A compound aspheric lens (a lens in which a spherical lens and an aspherical film formed on the spherical lens are integrally formed and function as one aspheric lens as a whole) is not regarded as cemented lenses, but the compound aspheric lens is regarded as a single lens. Unless otherwise specified, the sign of refractive power and the surface shape of a lens including an aspheric surface are considered in terms of the paraxial region.

The "focal length" used in a conditional expression is a paraxial focal length. The values used in Conditional Expressions are values in a case where the d line is used as a reference in a state where the object at infinity is in focus unless otherwise specified. The "d line", "C line", "F line" and "g line" described in the present specification are emission lines. The wavelength of the d line is 587.56 nm (nanometers), the wavelength of the C line is 656.27 nm (nanometers), the wavelength of the F line is 486.13 nm (nanometers), and the wavelength of g line is 435.84 nm (nanometers). Assuming that the refractive indices of the lens at the g line, the F line, and the C line are Ng, NF, and NC, the partial dispersion ratio θgF of a certain lens between the g line and the F line is defined as θgF=(Ng−NF)/(NF−NC).

According to the present disclosure, it is possible to provide an imaging lens of which the total length of a lens system is short and which has high optical performance by satisfactorily correcting various aberrations, and an imaging apparatus comprising the imaging lens.

DESCRIPTION OF THE PREFERRED EMBODIMENTS

Figure 1:
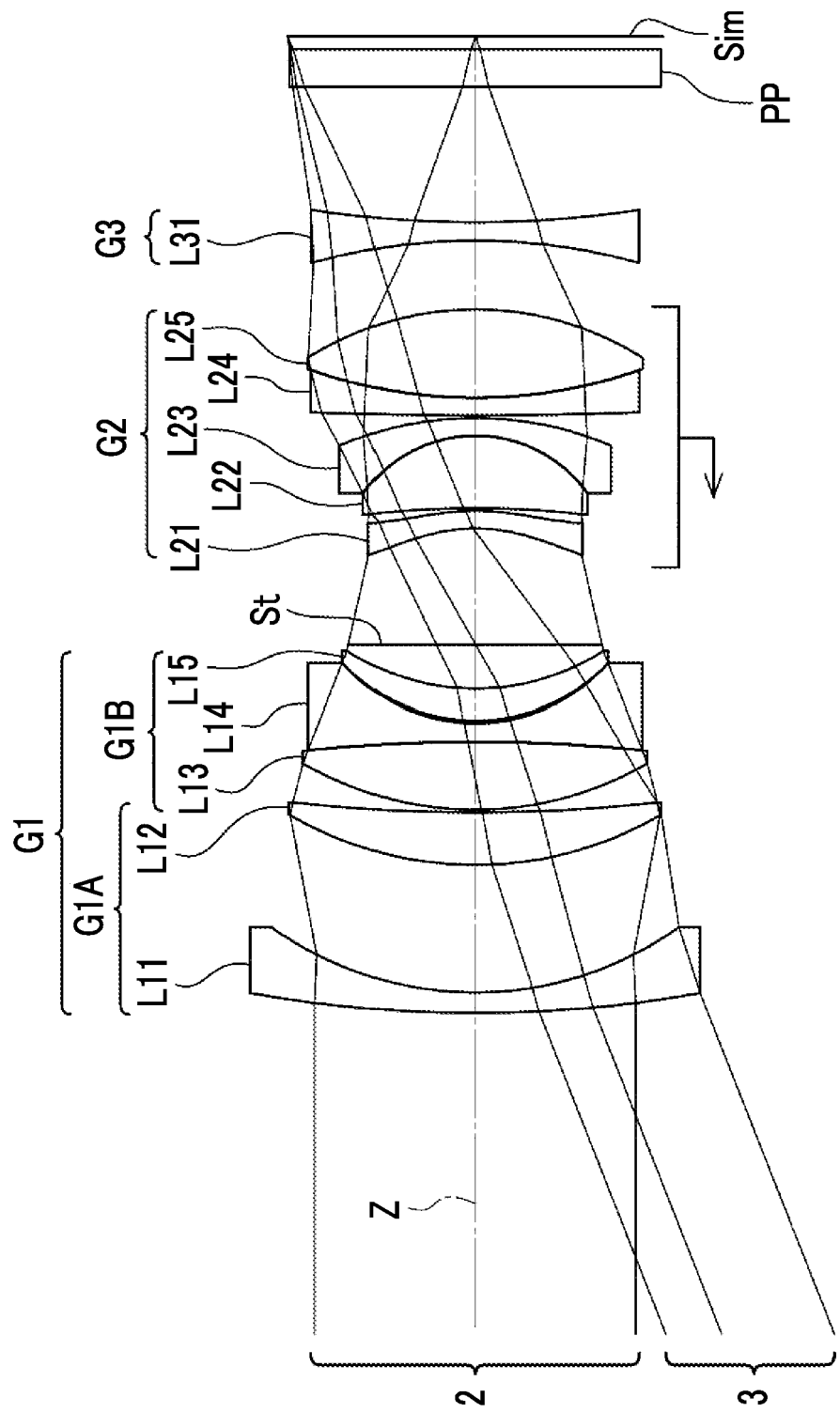
FIG. 1 is a cross-sectional view corresponding to the imaging lens of Example 1 of the present disclosure and showing a configuration and rays of an imaging lens according to an embodiment of the present disclosure.

Hereinafter, embodiments of the present disclosure will be described in detail with reference to the accompanying drawings. FIG. 1 shows a configuration of a cross section including an optical axis Z of an imaging lens according to an embodiment of the present disclosure. The example shown in FIG. 1 corresponds to the imaging lens of Example 1 to be described later. In FIG. 1, the left side is the object side, the right side is the image side, and a state in which an object at infinity is in focus is shown. FIG. 1 also shows on-axis rays 2 and rays with the maximum angle of view 3 as the rays.

FIG. 1 shows an example in which, assuming that an imaging lens is applied to an imaging apparatus, an optical member PP having a parallel plate shape is disposed on the image side of the imaging lens. The optical member PP is a member assumed to include at various filters, a cover glass, and/or the like. The various filters include, for example, a low pass filter, an infrared cut filter, and a filter that cuts a specific wavelength region. The optical member PP has no refractive power, and the optical member PP may be configured to be omitted.

The imaging lens of the present disclosure consists of, in order from the object side to the image side along the optical axis Z, a first lens group G1 having a positive refractive power, an aperture stop St, a second lens group G2 having a positive refractive power, and a third lens group G3 having a negative refractive power. It should be noted that the aperture stop St shown in FIG. 1 does not indicate a shape thereof, but indicates a position thereof on the optical axis.

This imaging lens adopts a telephoto type configuration in which positive, positive, and negative lens groups are arranged in order from the object side to the image side. With such a configuration, there is an advantage in reducing the total length of the lens system. In addition, by adopting a configuration in which lens groups having positive refractive powers are disposed on both sides of the aperture stop St, it becomes easy to suppress occurrence of distortion and lateral chromatic aberration.

For example, in the imaging lens shown in FIG. 1, the first lens group G1 consists of five lenses L11 to L15 in order from the object side to the image side, and the second lens group G2 consists of five lenses L21 to L25 in order from the object side to the image side, and the third lens group G3 consists of one lens L31.

The first lens group G1 is configured to include a negative lens which has a concave surface on the image side, and two positive lenses which are disposed to be closer to the image side than the negative lens and which have respective convex surfaces on the object side, convex surfaces on the object side. With the two positive lenses convex toward the object side, it becomes easy to suppress occurrence of astigmatism and spherical aberration. Further, by disposing a negative lens on the object side in the first lens group G1, the angle of the principal ray of the peripheral angle of view incident on the lens closer to the image side than the negative lens with respect to the optical axis Z can be reduced. It becomes easy to suppress occurrence of coma aberration. By making the image side surface of the negative lens concave, it becomes easy to suppress occurrence of astigmatism. More preferably, the lens closest to the object side in the first lens group G1 is a negative lens having a concave surface on the image side. In such a case, the above effect can be made more remarkable. In the example shown in FIG. 1, the lens L11 is a negative lens having a concave surface on the image side, and the lenses L12 and L13 are positive lenses having a convex surface on the object side.

As shown in FIG. 1, it is preferable that the first lens group G1 is configured to consist of, in order from the object side to the image side, a first A lens group G1A and a first B lens group G1B, and the first B lens group G1B is configured to consist of, in order from the object side to the image side, a cemented lens in which a positive lens convex toward the object side and a negative lens concave toward the image side are cemented, and a positive meniscus lens convex toward the object side. In such a case, it becomes easy to correct spherical aberration and longitudinal chromatic aberration while suppressing astigmatism through the cemented lens of the first B lens group G1B. Further, it becomes easy to suppress occurrence of spherical aberration and coma aberration while giving the first lens group G1 a positive refractive power through the positive meniscus lens convex toward the object side in the first B lens group G1B. In the example shown in FIG. 1, the first A lens group G1A consists of lenses L11 to L12, and the first B lens group G1B consists of lenses L13 to L15. As an example, the first A lens group G1A shown in FIG. 1 consists of, in order from the object side to the image side, a negative lens having a concave surface on the image side and a positive lens having a convex surface on the object side.

The second lens group G2 is configured to include an aspheric lens and two sets of cemented lenses disposed to be closer to the image side than the aspheric lens. Since the second lens group G2 includes an aspheric lens, there is an advantage in correcting spherical aberration. This aspheric lens preferably has a meniscus shape concave toward the object side in the paraxial region. In such a case, there is an advantage in correcting spherical aberration while suppressing occurrence of astigmatism. Since the second lens group G2 includes at least two sets of cemented lenses, the correction of chromatic aberration can be shared between these cemented lenses. More specifically, among the plurality of cemented lenses of the second lens group G2, the cemented lens on the object side is able to mainly correct longitudinal chromatic aberration, and the cemented lens on the image side is able to mainly correct lateral chromatic aberration. Therefore, it becomes easy to correct longitudinal chromatic aberration and lateral chromatic aberration simultaneously with favorable balance. In the example shown in FIG. 1, the lens L21 is an aspheric lens, the lens L22 and the lens L23 are cemented to each other, and the lens L24 and the lens L25 are cemented to each other.

In each of the two sets of cemented lenses of the second lens group G2, it is preferable that at least one positive lens and at least one negative lens are cemented. Hereinafter, a description will be given of a case where at least one positive lens and at least one negative lens are cemented in each of the two sets of cemented lenses of the second lens group G2.

It is preferable that a positive lens having a highest refractive index at a d line among the positive lenses included in the cemented lenses in the second lens group G2 is included in the cemented lens closest to the image side in the second lens group G2. By disposing the positive lens having a high refractive index at a position where the height of the principal ray is higher, there is an advantage in suppressing occurrence of field curvature. Further, among the positive lenses included in the cemented lenses in the second lens group G2, the positive lens having the largest Abbe number based on the d line is preferably included in the cemented lens closest to the object side in the second lens group G2. In such a case, there is an advantage in performing favorable correction while balancing longitudinal chromatic aberration and lateral chromatic aberration.

More specifically, it is preferable that the two sets of cemented lenses of the second lens group G2 are a first cemented lens in which a positive lens and a negative lens are cemented in order from the object side and which has a cemented surface convex toward the image side, and a second cemented lens which is disposed to be closer to the image side than the first cemented lens and a negative lens and a positive lens having a convex surface on the image side are cemented in order from the object side. In the first cemented lens, it is possible to correct longitudinal chromatic aberration while suppressing occurrence of astigmatism at the cemented surface. In the second cemented lens, it is possible to correct lateral chromatic aberration while suppressing astigmatism on the image side surface of the cemented lens.

It is preferable that the second lens group G2 be configured to consist of five lenses. In such a case, it is possible to reduce the total length of the lens system while obtaining the effects of the aspheric lens and the two sets of cemented lenses.

The second lens group G2 may be a lens group that moves during focusing (hereinafter, referred to as a focusing lens group). That is, the entire second lens group G2 may be configured to move along the optical axis Z during focusing. In such a case, as compared with a configuration in which the entire imaging lens is moved during focusing, it is possible to reduce the weight of the focusing lens group and reduce the fluctuation in the field curvature during focusing. The horizontal leftward arrow written below the second lens group G2 in FIG. 1 indicates that the entire second lens group G2 moves integrally to the object side during focusing from the object at infinity to the object at a short distance. Here, the phrase "move integrally" means to move by the same amount in the same direction at the same time.

The third lens group G3 is configured to consist of one lens component. One lens component is a lens having only two air contact surfaces including an object side surface and an image side surface on the optical axis, and means one single lens or one set of cemented lenses. By using the above configuration of the third lens group G3, there is an advantage in reducing the total length of the lens system as compared with a configuration including two or more lens components. The third lens group G3 in the example shown in FIG. 1 is a single lens, and in such a case, there is an advantage reducing the total length of the lens system. When the second lens group G2 is a focusing lens group, the third lens group G3 is formed as a single lens. Thereby, the movement stroke of the second lens group G2 during focusing can be easily ensured. There is an advantage in shortening the distance.

Next, a configuration relating to the conditional expressions will be described. In the imaging lens of the present disclosure, assuming that a focal length of the imaging lens in a state where an object at infinity is in focus is f and a focal length of the third lens group G3 is f3, it is preferable that Conditional Expression (1) is satisfied. By not allowing the corresponding value of Conditional Expression (1) to be less than the lower limit, it becomes easy to reduce the incident angle of the principal ray of the off-axis rays on the image plane Sim. By not allowing the corresponding value of Conditional Expression (1) to be more than the upper limit, there is an advantage in shortening the total length of the lens system. In addition, in a case of a configuration in which Conditional Expression (1-1) is satisfied, it is possible to obtain more favorable characteristics.

$$-1.5 < f/f3 < -0.4 \tag{1}$$

$$-1.3 < f/f3 < -0.5 \tag{1-1}$$

In the imaging lens of the present disclosure, assuming that a maximum value of refractive indexes of the positive lenses included in the cemented lenses in the second lens group G2 at the d line is N2cpmax, it is preferable that Conditional Expression (2) is satisfied. By not allowing the corresponding value of Conditional Expression (2) to be equal to or less than the lower limit, there is an advantage in suppressing occurrence of field curvature. In consideration of the characteristics of the refractive index and Abbe number of the existing optical material, by not allowing the corresponding value of Conditional Expression (2) to be equal to or greater than the upper limit, it is possible to suppress the dispersion from becoming excessively large. Thus, there is an advantage in suppressing occurrence of lateral chromatic aberration. In addition, in a case of a configuration in which Conditional Expression (2-1) is satisfied, it is possible to obtain more favorable characteristics.

$$1.8 < N2cpmax < 2.2 \tag{2}$$

$$1.8 < N2p < 2.1 \tag{2-1}$$

In the imaging lens of the present disclosure, assuming that a maximum value of Abbe numbers of the positive lenses included in the cemented lenses in the second lens group G2 based on the d line is v2cpmax, it is preferable that Conditional Expression (3) is satisfied. By not allowing the corresponding value of Conditional Expression (3) to be equal to or less than the lower limit, there is an advantage in suppressing occurrence of longitudinal chromatic aberration. In consideration of the characteristics of the refractive index and Abbe number of the existing optical material, by not allowing the corresponding value of Conditional Expression (3) to be equal to or greater than the upper limit, it is possible to suppress the refractive index from becoming excessively low. Thus, there is an advantage in suppressing occurrence of field curvature. In addition, in a case of a configuration in which Conditional Expression (3-1) is satisfied, it is possible to obtain more favorable characteristics.

$$50 < v2cpmax < 110 \tag{3}$$

$$60 < v2p < 105 \tag{3-1}$$

In the imaging lens of the present disclosure, assuming that a partial dispersion ratio of a positive lens having a largest Abbe number based on the d line among the positive lenses included in the cemented lenses in the second lens group G2 between a g line and an F line is θgFp, and a partial dispersion ratio of a negative lens cemented to the positive lens having the largest Abbe number based on the d line among the positive lenses included in the cemented lenses in the second lens group G2 between the g line and the F line is θgFn, it is preferable that the imaging lens includes at least one negative lens satisfying Conditional Expression (4). When the corresponding value of Conditional Expression (4) is equal to or greater than the lower limit, there is an advantage in suppressing occurrence of the primary chromatic aberration. By not allowing the corresponding value of Conditional Expression (4) to be equal to or greater than the upper limit, there is an advantage in suppressing occurrence of the secondary chromatic aberration. When the negative lens that satisfies Conditional Expression (4) further satisfies Conditional Expression (4-1), more favorable characteristics can be obtained.

$$0 < \theta gFn - \theta gFp < 0.06 \tag{4}$$

$$0.01 < \theta gFn - \theta gFp < 0.05 \tag{4-1}$$

In the imaging lens of the present disclosure, the second lens group G2 is a focusing lens group. Assuming that a lateral magnification of the second lens group G2 in a state where an object at infinity is in focus is β2 and a lateral magnification of the third lens group G3 in a state where an object at infinity is in focus is β3, it is preferable that Conditional Expression (5) is satisfied. By not allowing the corresponding value of Conditional Expression (5) to be equal to or less than the lower limit, it becomes easy to shorten the movement amount of the second lens group G2 during focusing. By not allowing the corresponding value of Conditional Expression (5) to be greater than the upper limit, it is possible to prevent fluctuation in the image plane position due to the movement of the second lens group G2 from becoming excessively large. Thus, it becomes easy to prevent the allowable error of the stop position of the second lens group G2 during focusing from becoming excessively small. In addition, in a case of a configuration in which Conditional Expression (5-1) is satisfied, it is possible to obtain more favorable characteristics.

$$1 < (1\beta2^2) \times \beta3^2 < 1.5 \tag{5}$$

$$1.05 < (1-\beta32^2) \times \beta3^2 < 1.4 \tag{5-1}$$

FIG. 1 shows an example in which the first A lens group G1A consists of two lenses, the first B lens group G1B consists of three lenses, the second lens group G2 consists of five lenses, and the third lens group G3 consists of one lens. However, the number of lenses constituting each lens group can be different from the number in the example shown in FIG. 1. For example, the first A lens group G1A may be configured to consist of two or more and four or less lenses. Specifically, for example, the first A lens group G1A consists of, in order from the object side to the image side, four lenses including a negative lens having a concave surface on the image side, a cemented lens in which a positive lens and a negative lens are cemented in order from the object side and which has a cemented surface convex toward the image side, and a positive lens having a convex surface on the object side.

The above-mentioned preferred configurations and available configurations including the configurations relating to the conditional expressions may be any combination, and it is preferable to selectively adopt the configurations in accordance with required specification. According to the present disclosure, it is possible to realize an imaging lens of which the total length of a lens system is short and which has high optical performance by satisfactorily correcting various aberrations.

Next, examples of the imaging lens of the present disclosure will be described.

EXAMPLE 1

The configuration and rays of the imaging lens according to Example 1 are shown in FIG. 1, and the illustration method and configuration thereof are as described above, and thus, repeated description will be partially omitted. The imaging lens of Example 1 consists of, in order from the object side to the image side, a first lens group G1 having a positive refractive power, an aperture stop St, a second lens group G2 having a positive refractive power, and a third lens group G3 having negative refractive power. The first lens group G1 consists of a first A lens group G1A and a first B lens group G1B in order from the object side to the image side. The first A lens group G1A consists of two lenses L11 and L12 in order from the object side to the image side. The first B lens group G1B consists of three lenses L13 to L15 in order from the object side to the image side. The second lens group G2 consists of five lenses L21 to L25 in order from the object side to the image side. The third lens group G3 consists of one lens L31. During focusing from the object at infinity to an object at the closest distance, the entire second lens group G2 moves along the optical axis Z integrally. The outline of the imaging lens of Example 1 has been described above.

Regarding the imaging lens of Example 1, Table 1 shows basic lens data, Table 2 shows specification, and Table 3 shows aspheric surface coefficients thereof. In Table 1, the column of Sn shows surface numbers. The surface closest to the object side is the first surface, and the surface numbers increase one by one toward the image side. The column of R shows radii of curvature of the respective surfaces. The column of D shows surface distances on the optical axis between the respective surfaces and the surfaces adjacent to the image side. Further, the column of Nd shows refractive indices of the respective components at the d line, the column of νd shows Abbe numbers of the respective components based on the d line, and the column of θgF shows partial dispersion ratios of the respective components between the g line and the F line.

In Table 1, the sign of the radius of curvature of the surface convex toward the object side is positive and the sign of the radius of curvature of the surface convex toward the image side is negative. Table 1 also shows the aperture stop St and the optical member PP. In Table 1, in a place of a surface number of a surface corresponding to the aperture stop St, the surface number and a term of (St) are noted. A value at the bottom place of D in Table 1 indicates a distance between the image plane Sim and the surface closest to the image side in the table.

Table 2 shows the focal length f of the imaging lens, the back focal length Bf at the air conversion distance, and the F number FNo., and the maximum total angle of view 2ω, based on the d line. (°) in the place of 2ω indicates that the unit thereof is a degree. The values shown in Tables 1 and 2 are values in the case of using the d line as a reference in a state where the object at infinity is in focus.

In Table 1, the reference sign * is attached to surface numbers of aspheric surfaces, and numerical values of the paraxial radius of curvature are written into the column of the radius of curvature of the aspheric surface. In Table 3, the row of Sn shows surface numbers of the aspheric surfaces, and the rows of KA and Am shows numerical values of the aspheric surface coefficients for each aspheric surface. m is an integer of 3 or more. For example, m=3, 4, 5, . . . , 20 for the aspheric surfaces of Example 1. The "E-n" (n: an integer) in numerical values of the aspheric surface coefficients of Table 3 indicates "×10$^{-n}$". KA and Am are the aspheric surface coefficients in the aspheric surface expression represented by the following expression.

$$Zd = C \times h^2 / \{1 + (1 - KA \times C^2 \times h^2)^{1/2}\} + \Sigma Am \times h^m$$

Here,

Zd is an aspheric surface depth (a length of a perpendicular from a point on an aspheric surface at height h to a plane that is perpendicular to the optical axis and contacts with the vertex of the aspheric surface), h is a height (a distance from the optical axis to the lens surface), C is an inverse of a paraxial radius of curvature, KA and Am are aspheric surface coefficients, and Σ in the aspheric surface expression means the sum with respect to m.

In data of each table, a degree is used as a unit of an angle, and mm (millimeter) is used as a unit of a length, but appropriate different units may be used since the optical system can be used even in a case where the system is enlarged or reduced in proportion. Each of the following tables shows numerical values rounded off to predetermined decimal places.

TABLE 1

| | | Example 1 | | | |
|---|---|---|---|---|---|
| Sn | R | D | Nd | νd | θgF |
| 1 | 100.00000 | 1.500 | 1.48749 | 70.24 | 0.53007 |
| 2 | 27.08000 | 9.430 | | | |
| 3 | 28.57000 | 3.870 | 2.00100 | 29.13 | 0.59952 |
| 4 | 127.70000 | 0.200 | | | |
| 5 | 26.55000 | 5.010 | 1.88300 | 40.80 | 0.56557 |
| 6 | −127.27000 | 1.350 | 1.85896 | 22.73 | 0.62844 |
| 7 | 13.72000 | 0.200 | | | |
| 8 | 14.21000 | 2.320 | 2.00100 | 29.13 | 0.59952 |
| 9 | 18.36000 | 3.240 | | | |
| 10(St) | ∞ | 8.580 | | | |
| *11 | −12.43000 | 1.300 | 1.58313 | 59.38 | 0.54237 |
| *12 | −17.95000 | 0.200 | | | |

TABLE 1-continued

Example 1

| Sn | R | D | Nd | vd | θgF |
|---|---|---|---|---|---|
| 13 | −69.89000 | 5.350 | 1.53775 | 74.70 | 0.53936 |
| 14 | −10.61000 | 1.300 | 1.61340 | 44.27 | 0.56340 |
| 15 | −27.01000 | 0.200 | | | |
| 16 | 339.74000 | 1.300 | 1.85896 | 22.73 | 0.62844 |
| 17 | 39.05000 | 6.510 | 1.88300 | 39.22 | 0.57295 |
| 18 | −24.36000 | 5.090 | | | |
| 19 | −47.28000 | 1.350 | 1.48749 | 70.24 | 0.53007 |
| 20 | 83.33000 | 10.000 | | | |
| 21 | ∞ | 2.800 | 1.51680 | 64.20 | 0.53430 |
| 22 | ∞ | 0.919 | | | |

TABLE 2

Example 1

| f | 35.019 |
|---|---|
| Bf | 12.766 |
| FNo. | 1.45 |
| 2ω(°) | 44.0 |

TABLE 3

Example 1

| Sn | 11 | 12 |
|---|---|---|
| KA | 1.0000000E−01 | 1.0000000E−01 |
| A3 | 2.2849194E−04 | 2.2823120E−04 |
| A4 | 1.8039575E−04 | 2.7607701E−04 |
| A5 | −1.1922059E−04 | −2.6118630E−04 |
| A6 | 7.1208120E−05 | 2.2412115E−04 |
| A7 | −1.1375884E−05 | −8.9844977E−05 |
| A8 | −3.2893493E−06 | 1.4167565E−05 |
| A9 | 1.2723526E−06 | 2.7262669E−06 |
| A10 | 1.3543112E−07 | −1.9330130E−06 |
| A11 | −1.7452373E−07 | 4.8146815E−07 |
| A12 | 5.2693183E−08 | −7.7171885E−08 |
| A13 | −9.1339288E−09 | 1.1451196E−08 |
| A14 | 1.0214168E−09 | −1.9878477E−09 |
| A15 | −8.1757915E−11 | 3.1113347E−10 |
| A16 | 7.1153651E−12 | −3.3311514E−11 |
| A17 | −8.7328239E−13 | 2.1010719E−12 |
| A18 | 8.6127011E−14 | −5.9495564E−14 |
| A19 | −4.7011584E−15 | −4.1495099E−16 |
| A20 | 1.0531121E−16 | 4.7049942E−17 |

Figure 4:
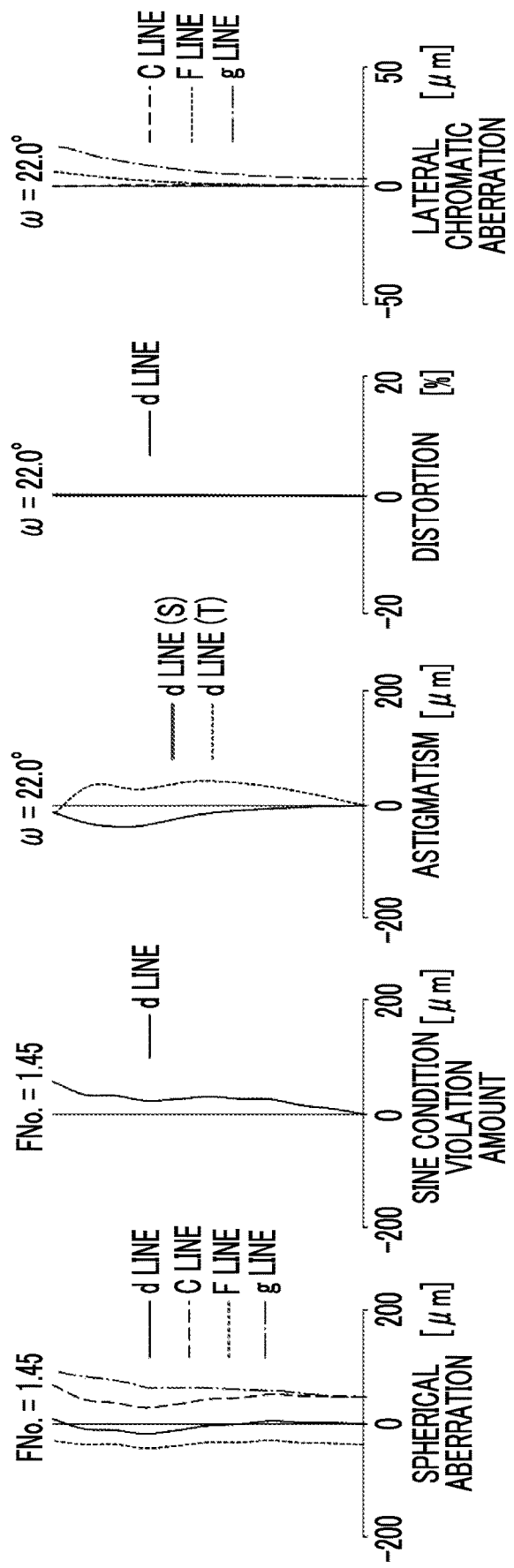
FIG. 4 is a diagram showing spherical aberration, a sine condition violation amount, astigmatism, distortion, and lateral chromatic aberration of the imaging lens of Example 1 of the present disclosure.

FIG. 4 shows aberration diagrams of the imaging lens of Example 1 in a state where the object at infinity is in focus. In FIG. 4, in order from the left side, spherical aberration, sine condition violation amount, astigmatism, distortion, and lateral chromatic aberration are shown. In the spherical aberration diagram, aberrations at the d line, the C line, the F line, and the g line are indicated by the solid line, the long dashed line, the short dash line, and the chain line, respectively. In the drawing of the sine condition violation amount, the amount at the d line is shown by the solid line. In the astigmatism diagram, aberration in the sagittal direction at the d line is indicated by the solid line, and aberration in the tangential direction at the d line is indicated by the short dashed line. In the distortion diagram, aberration at the d line is indicated by the solid line. In lateral chromatic aberration, aberrations at the C line, the F line, and the g line are respectively indicated by the long dashed line, the short dashed line, and the chain line. In the spherical aberration diagram, FNo. indicates an F number. In the other aberration diagrams, w indicates a half angle of view.

Symbols, meanings, description methods, and illustration methods of the respective data pieces according to Example 1 are the same as those in the following examples unless otherwise noted. Therefore, in the following description, repeated description will be omitted.

EXAMPLE 2

Figure 2:
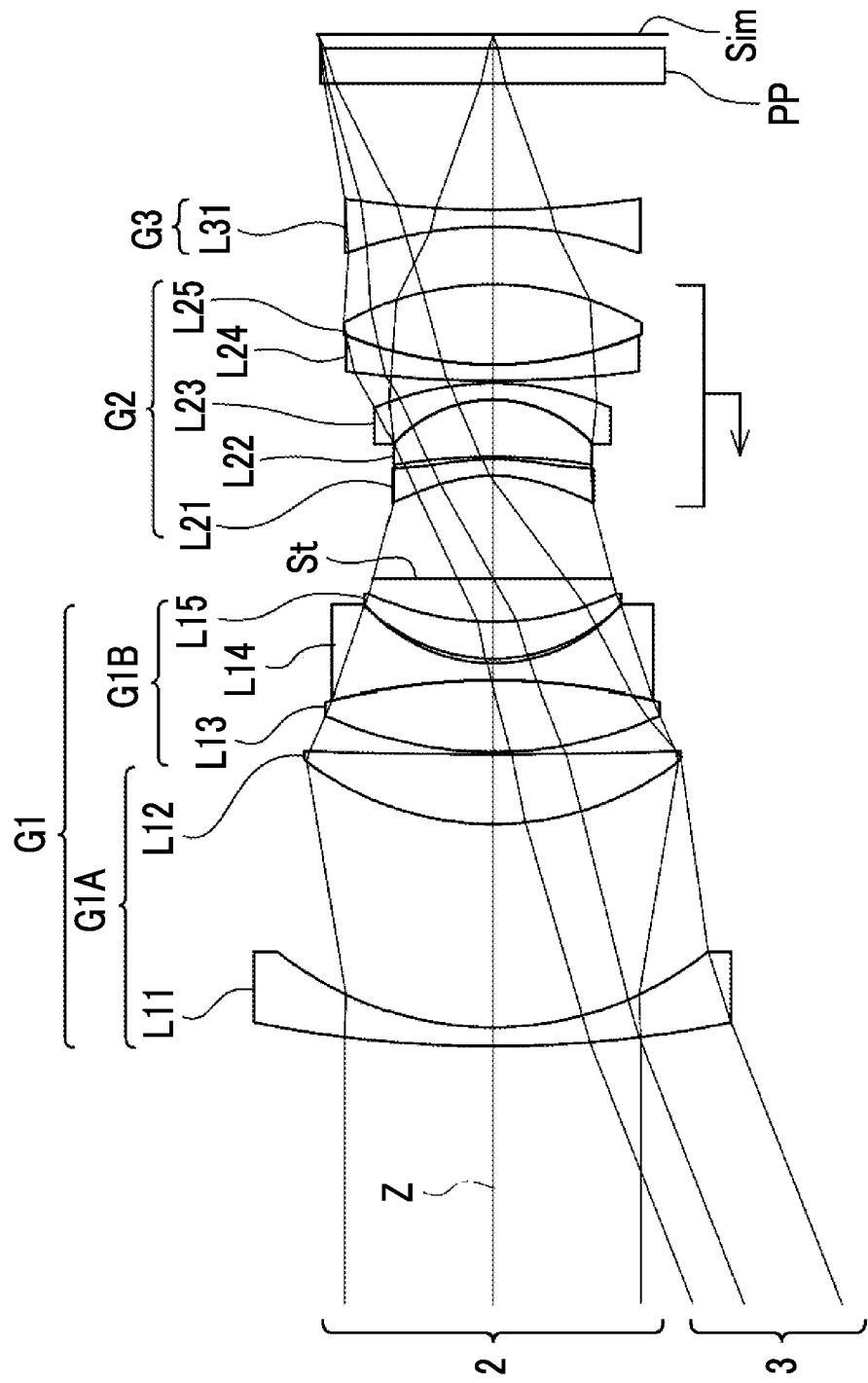
FIG. 2 is a cross-sectional view showing a configuration and rays of an imaging lens according to Example 2 of the present disclosure.
Figure 5:
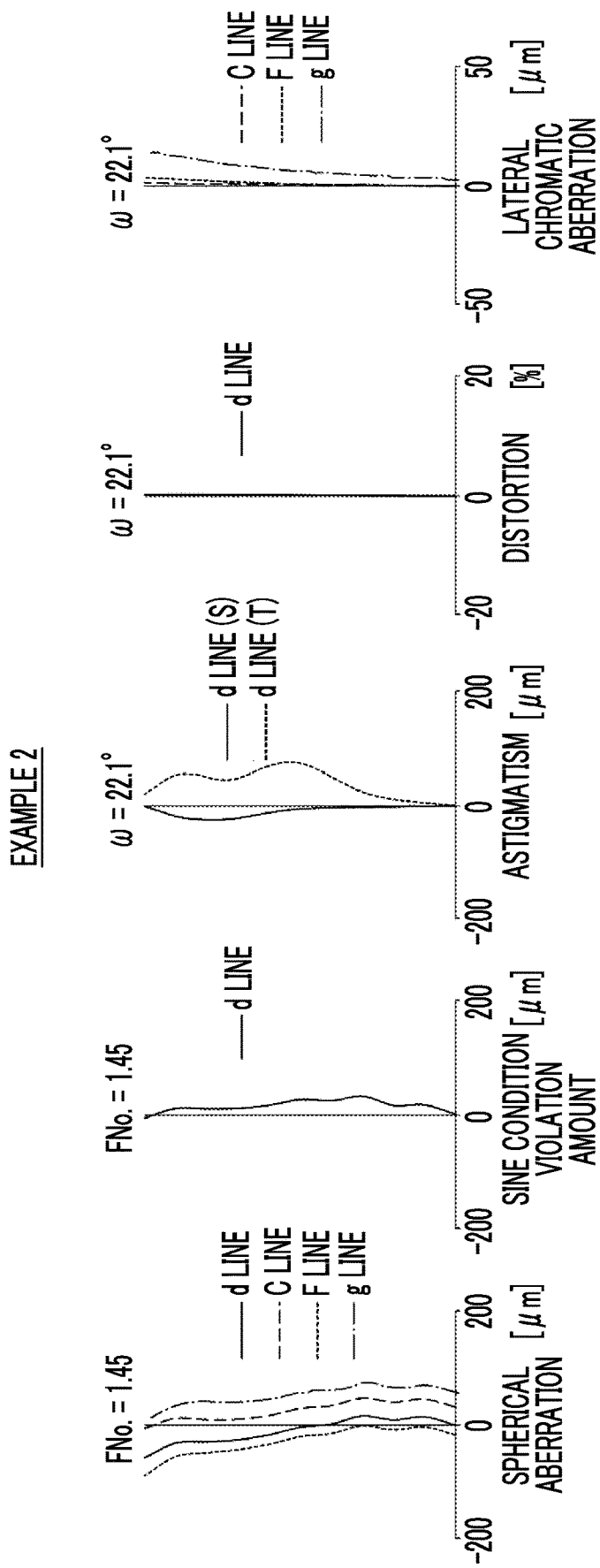
FIG. 5 is a diagram showing spherical aberration, a sine condition violation amount, astigmatism, distortion, and lateral chromatic aberration of the imaging lens of Example 2 of the present disclosure.

FIG. 2 is a cross-sectional view showing a configuration and rays of the imaging lens of Example 2. The imaging lens of Example 2 has the same configuration as the outline of the imaging lens of Example 1. Regarding the imaging lens of Example 2, Table 4 shows basic lens data, Table 5 shows specification, and Table 6 shows aspheric surface coefficients thereof, and FIG. 5 shows aberration diagrams.

TABLE 4

Example 2

| Sn | R | D | Nd | vd | θgF |
|---|---|---|---|---|---|
| 1 | 100.00000 | 1.500 | 1.48749 | 70.24 | 0.53007 |
| 2 | 28.63000 | 16.100 | | | |
| 3 | 25.51000 | 5.530 | 1.88300 | 40.80 | 0.56557 |
| 4 | 452.60000 | 0.200 | | | |
| 5 | 33.81000 | 5.580 | 1.49700 | 81.61 | 0.53887 |
| 6 | −56.92000 | 1.350 | 1.69895 | 30.13 | 0.60298 |
| 7 | 13.94000 | 0.370 | | | |
| 8 | 14.99000 | 2.920 | 1.91082 | 35.25 | 0.58224 |
| 9 | 23.80000 | 3.420 | | | |
| 10(St) | ∞ | 8.170 | | | |
| *11 | −12.53000 | 1.300 | 1.51633 | 64.06 | 0.53345 |
| *12 | −20.85000 | 0.200 | | | |
| 13 | −50.14000 | 4.510 | 1.49700 | 81.61 | 0.53887 |
| 14 | −11.13000 | 1.300 | 1.59551 | 39.24 | 0.58043 |
| 15 | −24.85000 | 0.200 | | | |
| 16 | 96.70000 | 1.300 | 1.85896 | 22.73 | 0.62844 |
| 17 | 31.98000 | 6.330 | 1.88300 | 40.76 | 0.56679 |
| 18 | −25.58000 | 4.570 | | | |
| 19 | −34.58000 | 1.350 | 1.48749 | 70.24 | 0.53007 |
| 20 | 83.33000 | 10.000 | | | |
| 21 | ∞ | 2.800 | 1.51680 | 64.20 | 0.53430 |
| 22 | ∞ | 1.069 | | | |

TABLE 5

Example 2

| f | 34.989 |
|---|---|
| Bf | 12.915 |
| FNo. | 1.45 |
| 2ω(°) | 44.2 |

TABLE 6

Example 2

| Sn | 11 | 12 |
|---|---|---|
| KA | 1.0000000E−01 | 1.0000000E−01 |
| A3 | −5.2550100E−04 | −2.9084148E−04 |
| A4 | 9.5022630E−04 | 6.8918858E−04 |
| A5 | −4.7739023E−04 | −4.0476077E−04 |
| A6 | 9.4362708E−05 | 2.2178650E−04 |
| A7 | 2.5590244E−05 | −7.1826126E−05 |
| A8 | −1.5113692E−05 | 7.0734762E−06 |
| A9 | 1.9361473E−06 | 4.9660214E−06 |
| A10 | 1.1497364E−07 | −2.7827653E−06 |
| A11 | −8.4504542E−09 | 7.6816219E−07 |
| A12 | −1.3156900E−08 | −1.4786756E−07 |
| A13 | 2.6124503E−09 | 2.4223614E−08 |
| A14 | −2.6930153E−10 | −3.7505651E−09 |
| A15 | 5.2623568E−11 | 5.0165999E−10 |

TABLE 6-continued

| | Example 2 | |
|---|---|---|
| Sn | 11 | 12 |
| A16 | −9.3872515E−12 | −4.9244131E−11 |
| A17 | 6.1024759E−13 | 3.0772240E−12 |
| A18 | 2.6516786E−14 | −9.9066089E−14 |
| A19 | −5.1069737E−15 | 4.5997054E−16 |
| A20 | 1.7710155E−16 | 4.0855602E−17 |

EXAMPLE 3

Figure 3:
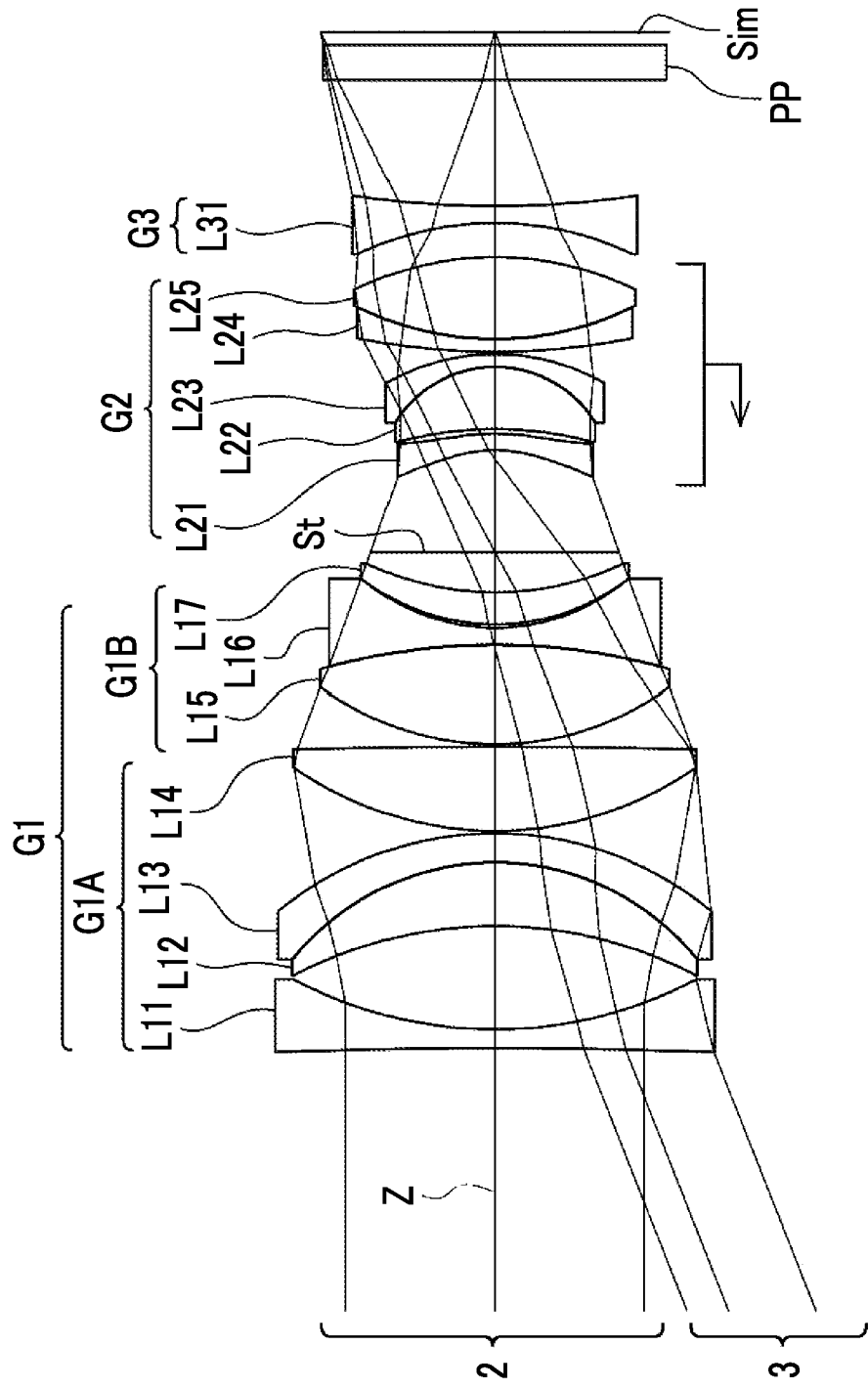
FIG. 3 is a cross-sectional view showing a configuration and rays of an imaging lens according to Example 3 of the present disclosure.
Figure 6:
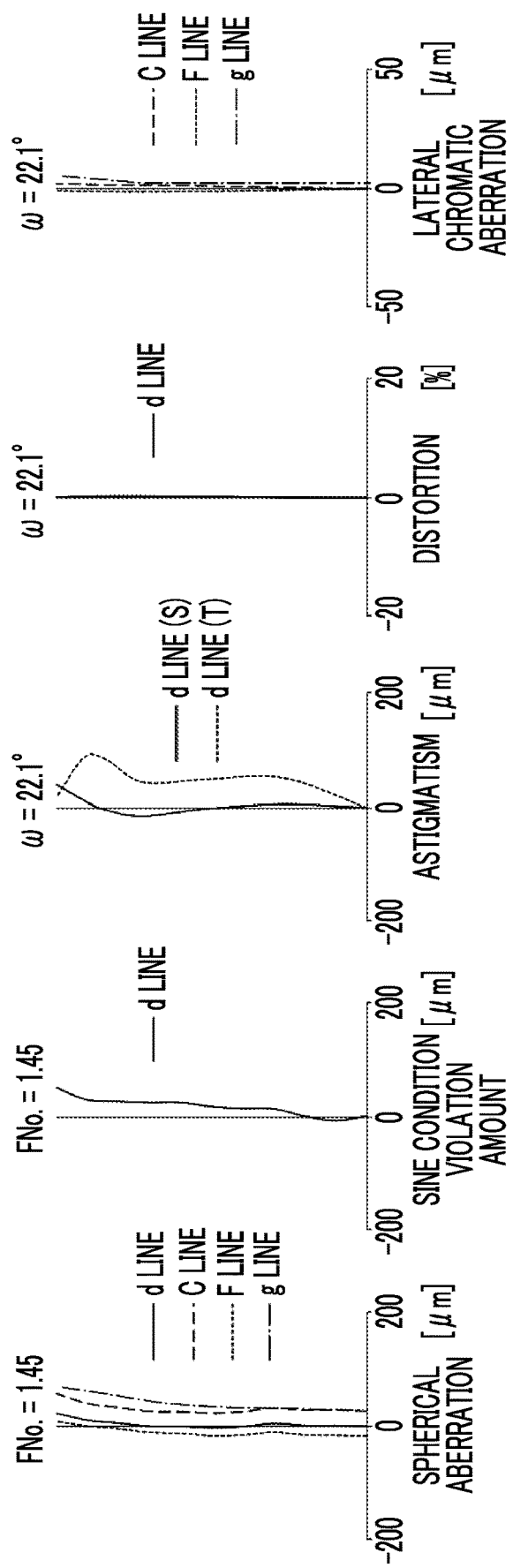
FIG. 6 is a diagram showing spherical aberration, a sine condition violation amount, astigmatism, distortion, and lateral chromatic aberration of the imaging lens of Example 3 of the present disclosure.

FIG. 3 is a cross-sectional view showing a configuration and rays of the imaging lens of Example 3. The imaging lens of Example 3 is configured to be similar to the outline of the imaging lens of Example 1 except the following points. The first A lens group G1A consist of four lenses L11 to L14 in order from the object side to the image side, and the first B lens group G1B consists of three lenses L15 to L17 in order from the object side to the image side. Regarding the imaging lens of Example 3, Table 7 shows basic lens data, Table 8 shows specification, and Table 9 shows aspheric surface coefficients thereof, and FIG. 6 shows aberration diagrams.

TABLE 7

| | Example 3 | | | | |
|---|---|---|---|---|---|
| Sn | R | D | Nd | νd | θgF |
| 1 | −510.40000 | 1.500 | 1.48749 | 70.24 | 0.53007 |
| 2 | 35.93000 | 8.210 | | | |
| 3 | −36.27000 | 5.050 | 1.43875 | 94.66 | 0.53402 |
| 4 | −21.54000 | 2.310 | 1.88100 | 40.14 | 0.57010 |
| 5 | −28.34000 | 0.200 | | | |
| 6 | 29.26000 | 6.660 | 1.77250 | 49.60 | 0.55212 |
| 7 | −697.47000 | 0.200 | | | |
| 8 | 24.71000 | 7.830 | 1.43875 | 94.66 | 0.53402 |
| 9 | −53.16000 | 1.350 | 1.60342 | 38.03 | 0.58356 |
| 10 | 17.17000 | 0.260 | | | |
| 11 | 18.11000 | 2.550 | 1.88100 | 40.14 | 0.57010 |
| 12 | 25.13000 | 3.190 | | | |
| 13(St) | ∞ | 8.090 | | | |
| *14 | −10.96000 | 1.320 | 1.51633 | 64.06 | 0.53345 |
| *15 | −17.96000 | 0.340 | | | |
| 16 | −32.27000 | 4.960 | 1.43875 | 94.66 | 0.53402 |
| 17 | −9.78000 | 1.000 | 1.56732 | 42.82 | 0.57309 |
| 18 | −18.48000 | 0.200 | | | |
| 19 | 59.22000 | 1.000 | 1.84666 | 23.78 | 0.62054 |
| 20 | 25.79000 | 6.510 | 1.83481 | 42.72 | 0.56486 |
| 21 | −26.65000 | 2.710 | | | |
| 22 | −26.64000 | 1.350 | 1.48749 | 70.24 | 0.53007 |
| 23 | 83.33000 | 10.000 | | | |
| 24 | ∞ | 2.800 | 1.51680 | 64.20 | 0.53430 |
| 25 | ∞ | 0.990 | | | |

TABLE 8

| Example 3 | |
|---|---|
| f | 35.006 |
| Bf | 12.836 |
| FNo. | 1.45 |
| 2ω(°) | 44.2 |

TABLE 9

| | Example 3 | |
|---|---|---|
| Sn | 14 | 15 |
| KA | 1.0000000E−01 | 1.0000000E−01 |
| A3 | −8.7852274E−04 | −8.7182795E−04 |
| A4 | 1.1830726E−03 | 1.2872950E−03 |
| A5 | −3.6394300E−04 | −5.4177602E−04 |
| A6 | 3.9893378E−05 | 2.0712410E−04 |
| A7 | 2.2140850E−05 | −5.4021371E−05 |
| A8 | −9.9364056E−06 | 3.9359201E−06 |
| A9 | 1.6184408E−06 | 4.3626073E−06 |
| A10 | −1.3589772E−07 | −2.5041055E−06 |
| A11 | 2.5454048E−08 | 7.5372037E−07 |
| A12 | −7.3451369E−09 | −1.5425259E−07 |
| A13 | 1.4333375E−09 | 2.4698095E−08 |
| A14 | −3.4127397E−10 | −3.5564611E−09 |
| A15 | 7.7083367E−11 | 4.6872863E−10 |
| A16 | −9.6610305E−12 | −4.8526561E−11 |
| A17 | 3.9788185E−13 | 3.2303315E−12 |
| A18 | 3.4611154E−14 | −1.0142566E−13 |
| A19 | −4.2683740E−15 | −5.7764462E−16 |
| A20 | 1.2909334E−16 | 8.9201070E−17 |

Table 10 shows values corresponding to Conditional Expressions (1) to (5) of the imaging lenses of Examples 1 to 3. In Examples 1 to 3, the d line is set as the reference wavelength. Table 10 shows the values based on the d line.

TABLE 10

| Expression Number | | Example 1 | Example 2 | Example 3 |
|---|---|---|---|---|
| (1) | f/f3 | −0.568 | −0.701 | −0.849 |
| (2) | N2cpmax | 1.88300 | 1.88300 | 1.83481 |
| (3) | ν2cpmax | 74.7 | 81.61 | 94.66 |
| (4) | θgFn − θgFp | 0.02404 | 0.04156 | 0.03907 |
| (5) | $(1 - \beta2^2) \times \beta3^2$ | 1.170 | 1.235 | 1.122 |

As can be seen from the above data, the imaging lenses of Examples 1 to 3 each have an F number of 1.45 which is a small F number, a short total length of the lens system, and realize high optical performance by satisfactorily correcting various aberrations including chromatic aberration.

Figure 7:
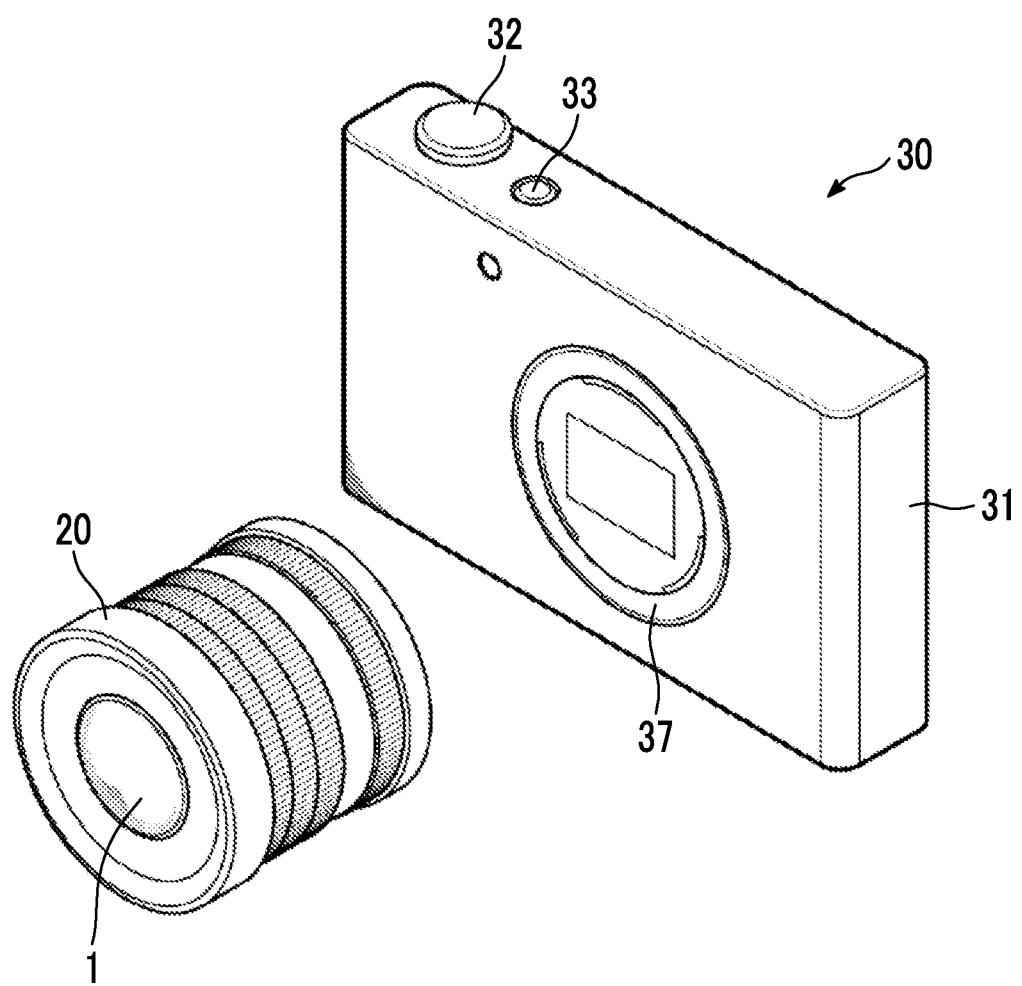
FIG. 7 is a perspective view of the front side of an imaging apparatus according to an embodiment of the present disclosure.
Figure 8:
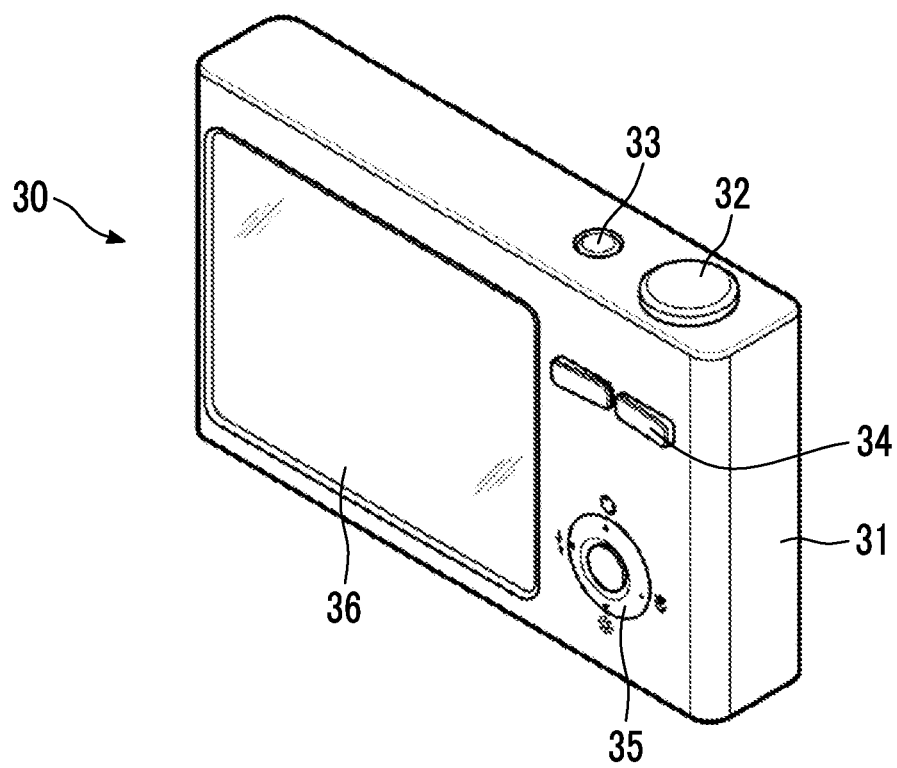
FIG. 8 is a perspective view of the rear side of an imaging apparatus according to an embodiment of the present disclosure.

Next, an imaging apparatus according to an embodiment of the present disclosure will be described. FIGS. 7 and 8 are external views of a camera 30 which is the imaging apparatus according to the embodiment of the present disclosure. FIG. 7 is a perspective view of the camera 30 viewed from the front side, and FIG. 8 is a perspective view of the camera 30 viewed from the rear side. The camera 30 is a so-called mirrorless type digital camera, and the interchangeable lens 20 can be detachably attached thereto. The interchangeable lens 20 is configured to include the imaging lens 1, which is housed in a lens barrel, according to an embodiment of the present disclosure.

The camera 30 comprises a camera body 31, and a shutter button 32 and a power button 33 are provided on an upper surface of the camera body 31. Further, an operation section 34, an operation section 35, and a display section 36 are provided on a rear surface of the camera body 31. The display section 36 displays a captured image and an image within an angle of view before imaging.

An imaging aperture, through which light from an imaging target is incident, is provided at the center on the front surface of the camera body 31. A mount 37 is provided at a position corresponding to the imaging aperture. The interchangeable lens 20 is mounted on the camera body 31 with the mount 37 interposed therebetween.

In the camera body 31, there are provided an imaging element, a signal processing circuit, a storage medium, and the like. The imaging element such as a charge coupled device (CCD) or a complementary metal oxide semiconductor (CMOS) outputs a captured image signal based on a subject image which is formed through the interchangeable lens 20. The signal processing circuit generates an image through processing of the captured image signal which is output from the imaging element. The storage medium stores the generated image. The camera 30 is able to capture a still image or a video by pressing the shutter button 32, and is able to store image data, which is obtained through imaging, in the storage medium.

The technology of the present disclosure has been hitherto described through embodiments and examples, but the technology of the present disclosure is not limited to the above-mentioned embodiments and examples, and may be modified into various forms. For example, values such as the radius of curvature, the surface distance, the refractive index, the Abbe number, and the aspheric surface coefficient of each lens are not limited to the values shown in the examples, and different values may be used therefor.

Further, the imaging apparatus according to the embodiment of the present disclosure is not limited to the above example, and may be modified into various forms such as a camera other than the mirrorless type, a film camera, and a video camera.

What is claimed is:

1. An imaging lens consisting of, in order from an object side to an image side: a first lens group having a positive refractive power; a stop; a second lens group having a positive refractive power; and a third lens group having a negative refractive power,
    wherein the first lens group includes a negative lens which has a concave surface on the image side, and two positive lenses which are disposed to be closer to the image side than the negative lens and which have respective convex surfaces on the object side,
    wherein the second lens group includes an aspheric lens, and two sets of cemented lenses disposed to be closer to the image side than the aspheric lens, and
    wherein the third lens group consists of one lens component.

2. The imaging lens according to claim 1, wherein assuming that a focal length of the imaging lens in a state where an object at infinity is in focus is f, and
    a focal length of the third lens group is f3, Conditional Expression (1) is satisfied, which is represented by $$-1.5 < f/f3 < -0.4 \qquad (1).$$

3. The imaging lens according to claim 1,
    wherein in each of the two sets of cemented lenses, at least one positive lens and at least one negative lens are cemented, and
    wherein assuming that a maximum value of refractive indexes of the positive lenses included in the cemented lenses in the second lens group at a d line is N2cpmax, Conditional Expression (2) is satisfied, which is represented by $$1.8 < N2cpmax < 2.2 \qquad (2).$$

4. The imaging lens according to claim 1,
    wherein in each of the two sets of cemented lenses, at least one positive lens and at least one negative lens are cemented, and
    wherein assuming that a maximum value of Abbe numbers of the positive lenses included in the cemented lenses in the second lens group based on a d line is v2cpmax, Conditional Expression (3) is satisfied, which is represented by $$50 < v2cpmax < 110 \qquad (3).$$

5. The imaging lens according to claim 4,
    wherein in each of the two sets of cemented lenses, at least one positive lens and at least one negative lens are cemented, and
    wherein assuming that
        a partial dispersion ratio of a positive lens having a largest Abbe number based on the d line among the positive lenses included in the cemented lenses in the second lens group between a g line and an F line is θgFp, and
    a partial dispersion ratio of a negative lens cemented to the positive lens having the largest Abbe number based on the d line among the positive lenses included in the cemented lenses in the second lens group between the g line and the F line is θgFn,
    the imaging lens includes at least one negative lens satisfying Conditional Expression (4) which is represented by $$0 < \theta gFn - \theta gFp < 0.06 \qquad (4).$$

6. The imaging lens according to claim 1, wherein the second lens group includes a first cemented lens in which a positive lens and a negative lens are cemented in order from the object side and which has a cemented surface convex toward the image side, and a second cemented lens which is disposed to be closer to the image side than the first cemented lens and in which a negative lens and a positive lens having a convex surface on the image side are cemented in order from the object side.

7. The imaging lens according to claim 1, wherein the entire second lens group moves along an optical axis during focusing.

8. The imaging lens according to claim 7, wherein assuming that
    a lateral magnification of the second lens group in a state where an object at infinity is in focus is β2, and
    a lateral magnification of the third lens group in a state where an object at infinity is in focus is β3,
    Conditional Expression (5) is satisfied, which is represented by $$1 < (1-\beta 2^2) \times \beta 3^2 < 1.5 \qquad (5).$$

9. The imaging lens according to claim 1,
    wherein in each of the two sets of cemented lenses, at least one positive lens and at least one negative lens are cemented, and
    wherein a positive lens having a highest refractive index at a d line among the positive lenses included in the cemented lenses in the second lens group is included in the cemented lens closest to the image side in the second lens group.

10. The imaging lens according to claim 1,
    wherein in each of the two sets of cemented lenses, at least one positive lens and at least one negative lens are cemented, and
    wherein a positive lens having a largest Abbe number based on a d line among the positive lenses included in the cemented lenses in the second lens group is included in the cemented lens closest to the object side in the second lens group.

11. The imaging lens according to claim 1,
wherein the first lens group consists of, in order from the object side to the image side, a first A lens group and a first B lens group, and
wherein the first B lens group consists of, in order from the object side to the image side, a cemented lens in which a positive lens convex toward the object side and a negative lens concave toward the image side are cemented, and a positive meniscus lens convex toward the object side.

12. The imaging lens according to claim 1, wherein a lens closest to the object side in the first lens group is a negative lens concave toward the image side.

13. The imaging lens according to claim 1, wherein the third lens group is a single lens.

14. The imaging lens according to claim 1, wherein the aspheric lens has a meniscus shape concave toward the object side in a paraxial region.

15. The imaging lens according to claim 1, wherein the second lens group consists of five lenses.

16. The imaging lens according to claim 2, wherein Conditional Expression (1-1) is satisfied, which is represented by $$-1.3 < f/f3 < -0.5 \tag{1-1}$$

17. The imaging lens according to claim 3, wherein Conditional Expression (2-1) is satisfied, which is represented by $$1.8 < N2p < 2.1 \tag{2-1}$$

18. The imaging lens according to claim 4, wherein Conditional Expression (3-1) is satisfied, which is represented by $$60 < v2p < 105 \tag{3-1}$$

19. The imaging lens according to claim 8, wherein Conditional Expression (5-1) is satisfied, which is represented by $$1.05 < (1-\beta2^2) \times \beta3^2 < 1.4 \tag{5-1}$$

20. An imaging apparatus comprising the imaging lens according to claim 1.

* * * * *